United States Patent
Chen et al.

(10) Patent No.: US 12,324,538 B2
(45) Date of Patent: Jun. 10, 2025

(54) SYSTEM AND METHOD FOR DETERMINING A COOKING TIME

(71) Applicant: KONINKLIJKE PHILIPS N.V., Eindhoven (NL)

(72) Inventors: Yun Chen, Eindhoven (NL); Weishun Bao, Eindhoven (NL); Weimin Xiao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 892 days.

(21) Appl. No.: 17/438,766

(22) PCT Filed: Mar. 5, 2020

(86) PCT No.: PCT/EP2020/055759
§ 371 (c)(1),
(2) Date: Sep. 13, 2021

(87) PCT Pub. No.: WO2020/187576
PCT Pub. Date: Sep. 24, 2020

(65) Prior Publication Data
US 2022/0151432 A1    May 19, 2022

(30) Foreign Application Priority Data

Mar. 15, 2019  (WO) ................ PCT/CN2019/078383
Apr. 16, 2019  (EP) ..................................... 19169498

(51) Int. Cl.
*A47J 36/32*    (2006.01)
(52) U.S. Cl.
CPC .................................. *A47J 36/321* (2018.08)
(58) Field of Classification Search
CPC .................................................. A47J 36/321
See application file for complete search history.

(56) References Cited

U.S. PATENT DOCUMENTS

| 6,957,111 B2 | 10/2005 | Zhu et al. |
| 9,486,099 B2 | 11/2016 | Valance |

(Continued)

FOREIGN PATENT DOCUMENTS

| CN | 204460337 U | 7/2015 |
| EP | 1199529 A2 | 4/2002 |

(Continued)

OTHER PUBLICATIONS

Extended European Search Report issued in connection with corresponding EP Application No. 19169498.3 dated Oct. 25, 2019.

(Continued)

*Primary Examiner* — Anthony J Weier
(74) *Attorney, Agent, or Firm* — Maschoff Brennan

(57) ABSTRACT

A computer-implemented method for determining a scaled cooking time for operating a cooking apparatus includes acquiring a recipe having information associated with one or more food ingredients, a recipe serving size, and a recipe cooking time, and acquiring a target serving size. The method further includes determining a recipe scale factor based on the target serving size and the recipe serving size, determining a main food ingredient from the one or more food ingredients, and determining whether an amount of overlap of the main food ingredient in a receptacle of the cooking apparatus exceeds a predetermined threshold. If it is determined that the amount of overlap of the main food ingredient exceeds the predetermined threshold, then the scaled cooking time corresponding to the target serving size is determined based on the recipe scale factor and the recipe cooking time.

19 Claims, 3 Drawing Sheets

(56) References Cited

U.S. PATENT DOCUMENTS

| | | |
|---|---|---|
| 2016/0081515 A1 | 3/2016 | Aboujassoum et al. |
| 2016/0174748 A1 | 6/2016 | Baldwin et al. |
| 2016/0241653 A1* | 8/2016 | Ciepiel .............. A47J 43/046 |
| 2016/0278563 A1 | 9/2016 | Choudhary |
| 2017/0035249 A1 | 2/2017 | Dickson, Jr. et al. |
| 2017/0082996 A1* | 3/2017 | Koennings ......... G05B 19/0426 |
| 2017/0258273 A1 | 9/2017 | Stach et al. |
| 2018/0000274 A1 | 1/2018 | Sun et al. |
| 2022/0151432 A1* | 5/2022 | Chen ..................... A47J 36/32 |

FOREIGN PATENT DOCUMENTS

| | | |
|---|---|---|
| JP | 2003120938 A | 4/2003 |
| WO | 2007051049 A2 | 5/2007 |
| WO | 2015195575 A1 | 12/2015 |
| WO | 2018011099 A1 | 1/2018 |

OTHER PUBLICATIONS

International Search Report and Written Opinion issued in connection with corresponding PCT Application No. PCT/EP2020/055759 dated May 19, 2020.

* cited by examiner

SYSTEM AND METHOD FOR DETERMINING A COOKING TIME

CROSS-REFERENCE TO RELATED APPLICATIONS

The present application is a U.S. National Phase application under 35 U.S.C. § 371 of International Application No. PCT/EP2020/055759, filed on Mar. 5, 2020, which claims the benefit of International Application No. PCT/CN2019/078383, filed on Mar. 15, 2019 and European Patent Application No. 19169498.3, filed on Apr. 16, 2019. These applications are hereby incorporated by reference herein.

FIELD OF THE INVENTION

The present disclosure relates to a method for determining a scaled cooking time for operating a cooking apparatus and a system for determining a scaled cooking time for operating a cooking apparatus.

BACKGROUND OF THE INVENTION

Many cooking devices that aim to save time and labor have been devised to assist home cooking. For example, some devices such as food processors be used for preparing food ingredients prior to cooking, and other devices such as microwave ovens, slow-cookers, air fryers, are specially adapted to assist in cooking the prepared food ingredients. Many devices that assist the cooking of prepared food ingredients may be programmed to perform certain functions. Usually, for the same type of cooking device, consumers are provided with a variety of models available for selection and these models vary in their sizes, capacities, temperature ranges, powers, etc. For example, different models of air fryers may have different sizes, capacities, temperature ranges, powers, and receptacle volumes so as to fulfil the cooking requirements of different households. For this reason, sometimes manufacturers of the cooking devices may provide preset recipes that are suitable with respect to each of the different models, and in these recipes the cooking temperature, cooking time, amounts of food ingredients, and other instructions are explicitly outlined. When the user follows the instructions in a recipe provided for a specific model of the cooking device, a high quality of the final product can be guaranteed.

SUMMARY OF THE INVENTION

As mentioned above, manufacturers of cooking devices sometimes provide recipes for use at a certain model of a cooking device so as to assist users in home cooking. However, these recipes are typically provided for a predetermined serving size. For example, a recipe designed for use at an air fryer may have a serving size of 4 people. This may pose a problem when a user wishes to follow the recipe for preparing food for a different serving size. In addition to scaling up or scaling down the amounts of food ingredients called for in the recipe, the user also has to consider adjustments to the cooking time for the recipe. Users with limited cooking skills or those who are unfamiliar with the operation of the cooking device (or the particular model of cooking device) may find it difficult to make the necessary adjustments to the cooking time of the recipe so as to ensure a high quality of the final product. It is therefore important to provide a method which can automatically determine a scaled cooking time for a recipe which corresponds to a target serving size so as to ensure a high quality of the resulting dish.

To better address one or more of the concerns mentioned earlier, in a first aspect, a computer-implemented method at a control unit for determining a scaled cooking time for operating a cooking apparatus is provided. The method comprises: acquiring a recipe comprising information associated with: one or more food ingredients, a recipe serving size, and a recipe cooking time; acquiring a target serving size, wherein the target serving size is different from the recipe serving size; determining a recipe scale factor based on the target serving size and the recipe serving size; determining a main food ingredient from the one or more food ingredients in the acquired recipe; and determining whether an amount of overlap of the main food ingredient received in the receptacle of the cooking apparatus exceeds a predetermined threshold, wherein if it is determined that the amount of overlap of the main food ingredient exceeds the predetermined threshold, the method comprises determining the scaled cooking time corresponding to the target serving size based on the determined recipe scale factor and the recipe cooking time.

In some embodiments, the method may further comprise determining whether the main food ingredient is potato. In these embodiments, if it is determined that the main food ingredient is potato, determining the scaled cooking time may comprise: acquiring a quantity of the potato received in the receptacle of the cooking apparatus; obtaining a scaling value by multiplying the quantity of the potato received in the receptacle by a predetermined ingredient scale factor; and determining whether the target serving size is larger or smaller than the recipe serving size. Also, in these embodiments, if it is determined that the target serving size is larger than the recipe serving size, the scaled cooking time may be a sum of the recipe cooking time and the scaling value; if it is determined that the target serving size is smaller than the recipe serving size, the scaled cooking time may be a difference between the recipe cooking time and the scaling value.

In some embodiments, if it is determined that the main food ingredient is not potato, determining the scaled cooking time may comprise obtaining a scaling value by multiplying the recipe cooking time by an exponential of the recipe scale factor. In these embodiments, the exponent may have a predetermined value.

In some embodiments, the acquired recipe may further comprise information associated with a recipe quantity of each of the one or more food ingredients. In these embodiments, the method may further comprise determining a scaled quantity for each of the one or more food ingredients in the acquired recipe based on the determined recipe scale factor.

In some embodiments, determining a scaled quantity for each of the one or more food ingredients in the acquired recipe may comprise performing the following steps for each of the one or more food ingredients: determining a preliminary scaled quantity by multiplying the respective recipe quantity by the determined recipe scale factor; determining whether the recipe quantity is expressed in one of: a weight value, a non-weight value, or a unit of measurement value; and determining a resulting scaled quantity for the respective food ingredient based on whether the respective recipe quantity is expressed in one of: a weight value, a non-weight value, or a unit of measurement value. In these embodiments, if the recipe quantity is expressed in a weight value, the resulting scaled quantity may have the same value as the preliminary scaled quantity; if the recipe quantity is expressed in a non-weight value, the resulting scaled quantity may be determined by rounding up the preliminary scaled quantity to the nearest integer, wherein a minimum value of the resulting scaled quantity is 1; if the recipe quantity is expressed in a unit of measurement value, the resulting scaled quantity may be determined by rounding off the preliminary scaled quantity to the nearest quarter unit of measurement.

In some embodiments, determining the main food ingredient may comprise selecting the food ingredient associated with the largest recipe quantity in the acquired recipe as the main food ingredient.

In some embodiments, if it is determined that the amount of overlap of the main food ingredient received in the receptacle does not exceed the predetermined threshold, the method may further comprise determining the recipe cooking time as the scaled cooking time.

In some embodiments, the method may further comprise receiving a user input indicating whether the sizes of the main food ingredients (e.g. potatoes) received in the receptacle are similar to each other. In these embodiments, the processor may be configured to determine that the amount of overlap of the main food ingredient does not exceed the predetermined threshold only if it is indicated by the user the size of the main food ingredients received in the receptacle are similar to each other.

In some embodiments, acquiring the recipe may comprise receiving a user selection of the recipe from a plurality of recipes associated with the cooking apparatus.

In some embodiments, the method may further comprise receiving a user input indicating whether an amount of overlap of the main food ingredient received in the receptacle exceeds the predetermined threshold. In these embodiments, determining whether an amount of overlap of the main food ingredient exceeds the predetermined threshold may be based on the received user input.

In some embodiments, acquiring a target serving size may comprise receiving a user input indicating the target serving size.

In some embodiments, the predetermined threshold may be associated with the determined main food ingredient.

In a second aspect, there is provided a system for determining a scaled cooking time for operating a cooking apparatus, wherein the cooking apparatus comprises a receptacle configured to receive one or more food ingredients. The system comprises a processor configured to: acquire a recipe comprising information associated with: one or more food ingredients, a recipe serving size, and a recipe cooking time; acquire a target serving size, wherein the target serving size is different from the recipe serving size; determine a recipe scale factor based on the target serving size and the recipe serving size; determine a main food ingredient from the one or more food ingredients in the acquired recipe; and determine whether an amount of overlap of the main food ingredient received in the receptacle of the cooking apparatus exceeds a predetermined threshold, wherein if it is determined that the amount of overlap of the main food ingredient exceeds the predetermined threshold, the processor is further configured to determine the scaled cooking time corresponding to the target serving size based on the determined recipe scale factor and the recipe cooking time.

In some embodiments, the system may further comprise the cooking apparatus. In these embodiments, the processor may be connectable to the cooking apparatus wirelessly.

In some embodiments, the cooking apparatus may comprise: the receptacle configured to receive the one or more food ingredients; a sensor unit arranged adjacent to the receptacle, wherein the sensor unit is configured to detect a status of the one or more food ingredients received in the receptacle. In these embodiments, the processor may be configured to determine whether an amount of overlap of the main food ingredient received in the receptacle exceeds the predetermined threshold based on the detected status of the one or more food ingredients received in the receptacle.

According to the aspects and embodiments described above, the limitations of existing techniques are addressed. In particular, the above-described aspects and embodiments enable a cooking time for a recipe to be automatically scaled according to a desired serving size such that a high quality of the resulting dish can be ensured. There is thus provided an improved method and apparatus for determining a scaled cooking time for operating a cooking apparatus so as to guide a user to prepare a dish properly and easily.

These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF EMBODIMENTS

As noted above, there is provided a method for determining a scaled cooking time for operating a cooking apparatus and a system for determining a scaled cooking time for operating a cooking apparatus, which address the existing problems.

Figure 1:
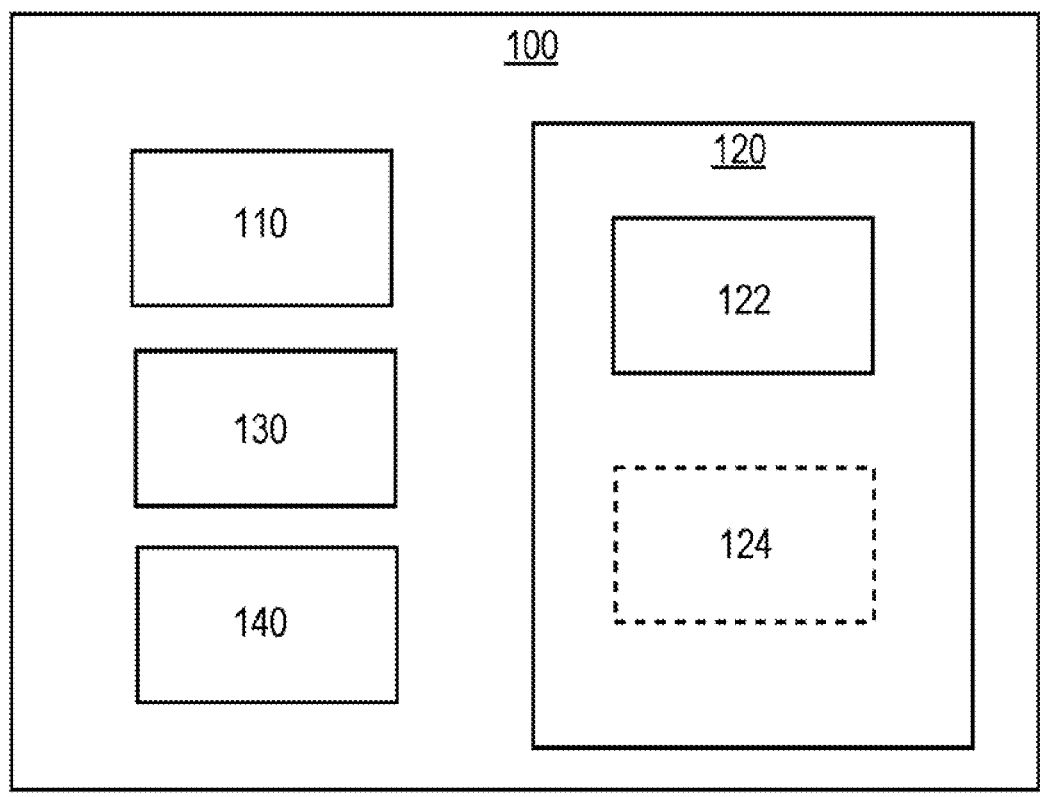
FIG. 1 is a block diagram of a system for determining a scaled cooking time for operating a cooking apparatus according to an embodiment.

FIG. 1 shows a block diagram of a system 100 for determining a scaled cooking time for operating a cooking apparatus according to an embodiment. The system comprises a processor 110 and a cooking apparatus 120. The cooking apparatus 120 comprises a receptacle 122 configured to receive one or more food ingredients and a sensor unit 124 configured to detect a status of the one or more food ingredients received in the receptacle 122.

The processor 110 can control the operation of the system 100 and can implement the method described herein. The processor 110 can comprise one or more processors, processing units, multi-core processor or modules that are configured or programmed to control the system 100 in the manner described herein. In particular implementations, the processor 110 can comprise a plurality of software and/or hardware modules that are each configured to perform, or are for performing, individual or multiple steps of the method described herein.

Briefly, the processor 110 is configured to acquire a recipe comprising information associated with: one or more food ingredients, a recipe serving size, and a recipe cooking time, and to acquire a target serving size, the target serving size being different from the recipe serving size. For example, the recipe serving size may be for 4 people while the target serving size may be for 2 people. In some embodiments, the recipe may comprise instructions for preparing the one or more food ingredients, for example "oven bake 400 g of potatoes for 15 minutes". The processor 110 is then configured to determine a recipe scale factor based on the target serving size and the recipe serving size. This determination may be based on a predetermined formula.

Based on the one or more food ingredients in the acquired recipe, the processor 110 is further configured to determine a main food ingredient, and subsequently determine whether an amount of overlap of the main food ingredient received in the receptacle 122 of the cooking apparatus 120 exceeds a predetermined threshold. If it is determined that the amount of overlap of the main food ingredient exceeds the predetermined threshold, the processor 110 is further configured to determine the scaled cooking time corresponding to the target serving size based on the determined recipe scale factor and the recipe cooking time.

As mentioned above, in this embodiment the cooking apparatus 120 further comprises a sensor unit 124 configured to detect a status of the one or more food ingredients received in the receptacle 122. The sensor unit 124 may be arranged adjacent to the receptacle, and it may be implemented as a camera. In some embodiments, the processor 110 may be configured to determine whether an amount of overlap of the main food ingredient received in the receptacle 122 exceeds the predetermined threshold based on the detected status of the one or more food ingredients received in the receptacle.

In some embodiments, the processor 110 may be implemented as part of the cooking apparatus 120. For example, the processor 110 may be implemented as a control unit of the cooking apparatus 120. In alternative embodiments, the processor 110 may be contactable to the cooking apparatus 120 wirelessly. For example, in some embodiments, the processor 110 may be implemented as part of an external device (e.g. a smartphone or a tablet), the external device being connectable to the cooking apparatus 120 wirelessly. The functionalities and processes described herein may be performed at this external device, for example via an application on a smartphone or a tablet.

In some embodiments, the system 100 may further comprise at least one user interface 130, which may be implemented as part of the cooking apparatus 120 or a separate device external to (i.e. separate to or remote from) the cooking apparatus 120. For example, at least one user interface 130 may be part of a smart phone or a tablet. A user interface 130 may be for use in providing a user of the system 100 with information resulting from the method described herein. For example, the processor 110 may be configured to control one or more user interfaces 130 to render (or output or display) the determined scaled cooking time corresponding to the target serving size. Alternatively or in addition, a user interface 130 may be configured to receive a user input. For example, a user interface 130 may allow a user of the system 100 to manually enter instructions, data, or information. In these embodiments, the processor 110 may be configured to acquire the user input from one or more user interfaces 130.

A user interface 130 may be any user interface that enables the rendering (or output or display) of information to a user of the system 100. Alternatively or in addition, a user interface 130 may be any user interface that enables a user of the system 100 to provide a user input, interact with and/or control the system 100. For example, the user interface 130 may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, the system 100 may comprise a memory 140. Alternatively or in addition, one or more memories 140 may be external to (i.e. separate to or remote from) the system 100. For example, one or more memories 140 may be part of another device (e.g. a smart phone or a tablet). A memory 140 can be configured to store program code that can be executed by the processor 110 to perform the method described herein. A memory can be used to store information, data, signals and measurements acquired or made by the processor 110 of the system 100. For example, a memory 140 may be used to store (for example, in a local file) a plurality of recipes to be acquired or selected by the processor 110. The processor 110 may be configured to control a memory 140 to store the plurality of recipes.

In some embodiments, the system 100 may comprise a communications interface (or circuitry) (not shown) for enabling the system 100 to communicate with any interfaces, memories, and/or devices that are internal or external to the system 100. The communications interface may communicate with any interfaces, memories, and/or devices wirelessly or via a wired connection. For example, the communications interface may communicate with one or more user interfaces 130 wirelessly or via a wired connection. Similarly, the communications interface may communicate with the one or more memories 140 wirelessly or via a wired connection.

It will be appreciated that FIG. 1 only shows the components required to illustrate an aspect of the system 100 and the cooking apparatus 120 and, in a practical implementation, the system 100 and/or the cooking apparatus 120 may comprise alternative or additional components to those shown. For example, in some embodiments, the cooking apparatus 120 may not comprise a sensor unit. Also, for example, the system 100 may not comprise a user interface, a memory, or a communications interface. As another example, the cooking apparatus 120 may further comprise a battery or other power supply for powering the cooking apparatus 120 or means for connecting the cooking apparatus 120 to a mains power supply.

Figure 2:
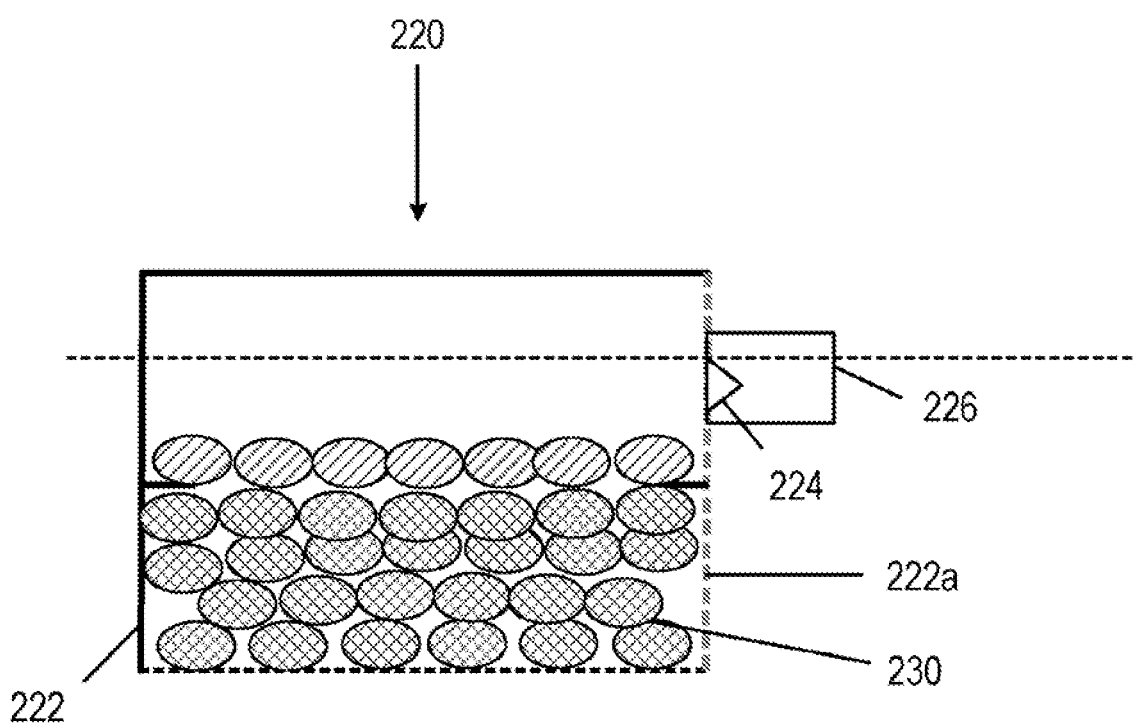
FIG. 2 illustrates a cross-sectional view of a cooking apparatus according to an embodiment.

FIG. 2 illustrates a cross-sectional view of a cooking apparatus 220 according to an embodiment. The cooking apparatus 220 is a component of a system for determining a scaled cooking time for operating a cooking apparatus according to an embodiment, such as the system 100 as described with reference to FIG. 1.

In the present embodiment, the cooking apparatus 220 comprises a receptacle 222 configured to receive one or more food ingredients 230 and a sensor unit 224 configured to detect a status of the one or more food ingredients 230 received in the receptacle 222. As shown in the drawing, the sensor unit 224 is arranged adjacent to the receptacle 222. Specifically, the sensor unit 224 in this embodiment is a camera which is attached to a side wall 222a of the receptacle 222 such that the camera points towards the interior of the receptacle 222. The side wall 222a at which the sensor unit 224 is attached is transparent so as to allow the sensor unit 224 to detect a status of the food ingredients 230 received in the receptacle 222. Moreover, the cooking apparatus 220 also comprises a cover 226 for the sensor unit 224 to protect the sensor unit 224 from external influence and/or damage.

The cooking apparatus 220 may be wirelessly connected to a processor, such as the processor 110 as described with reference to FIG. 1. In this embodiment, the status of the one or more food ingredients 230 received in the receptacle 222 as detected by the sensor unit 224 may also be wirelessly transmitted to the processor (e.g. a control unit at an external device) such that the processor can determine whether an amount of overlap of the main food ingredient received in the receptacle 222 exceeds the predetermined threshold based on the detected status of the one or more food ingredients received in the receptacle. Accordingly, by implementing a sensor unit 224 in the cooking apparatus 220, a reliable determination of whether an amount of overlap of the main food ingredient received in the receptacle 222 exceeds the predetermined threshold can be achieved without necessarily requiring manual operation by a user.

Figure 3:
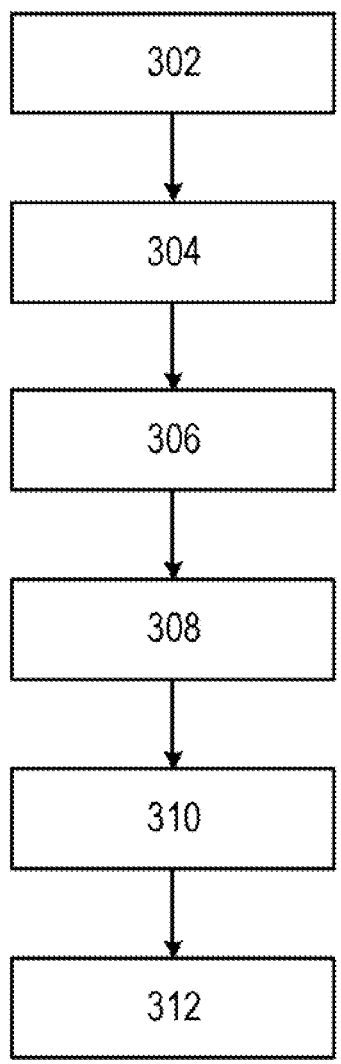
FIG. 3 illustrates a method for determining a scaled cooking time for operating a cooking apparatus according to an embodiment.

FIG. 3 illustrates a computer-implemented method for determining a scaled cooking time for operating a cooking apparatus. The illustrated method can generally be performed by or under the control of processor 110 of the system 100 as shown in FIG. 1. In other words, the method of FIG. 3 can generally be performed for determining a scaled cooking time for operating the cooking apparatus 120 of FIG. 1. The method of FIG. 3 can also be performed for determining a scaled cooking time for operating the cooking apparatus 220 of FIG. 2.

With reference to FIG. 3, at block 302, a recipe comprising information associated with: one or more food ingredients, a recipe serving size, and a recipe cooking time is acquired. More specifically, the recipe may be acquired by the processor 110 of the system 100. In some embodiments, acquiring the recipe at block 302 may comprise receiving a user selection of the recipe from a plurality of recipes associated with the cooking apparatus 120. The plurality of recipes associated with the cooking apparatus may be stored at a memory 140 of the system 100. For example, in some embodiments a user interface may be provided by way of an application of a smart phone. The processor 110 may therefore be implemented as a part of the smart phone for controlling a display of the smart phone to render the application so as to provide a plurality of recipes that are associated with the cooking apparatus 120. This way, the user is able to indicate a selection via the touch screen of the smart phone as well as review the information of the recipe (e.g. the one or more food ingredients, the recipe serving size, and the recipe cooking time).

Furthermore, in some embodiments, acquiring the recipe in block 302 may comprise receiving a user selection of the recipe from a plurality of recipes associated with the cooking apparatus. For example, the plurality of recipes available for selection by the user may be associated with at least one of: a particular type of the cooking apparatus (e.g. an air fryer, a cooking oven, a steamer, etc.), a particular model of the cooking apparatus, and a maximum capacity of the cooking apparatus.

Returning back to FIG. 3, at block 304, a target serving size that is different from the recipe serving size is acquired. More specifically, the target serving size may be acquired by the processor 110 of the system 100. The target serving size may be received via a user input at the user interface 130 of the system 100. For example, the user may have selected a specific recipe at block 302 which has a serving size of "4 people", and the user may then input a target serving size of "2 people" via a virtual keyboard of a smart phone or a tablet.

Returning back to FIG. 3, at block 306, a recipe scale factor is determined based on the target serving size acquired at block 304 and the recipe serving size from the recipe acquired at block 302. More specifically, the recipe scale factor may be determined by the processor 110 of the system 100. In some embodiments, the determination of the recipe scale factor may be based on the equation:

$$\text{recipe scale factor} = \frac{\text{target serving size}}{\text{recipe serving size}} \quad (1)$$

Returning back to FIG. 3, at block 308, a main food ingredient is determined from the one or more food ingredients in the recipe acquired at block 302. More specifically, the main food ingredient may be determined by the processor 110 of the system 100. In some embodiments, the recipe acquired at block 302 may further comprise information associated with a recipe quantity of each of the one or more food ingredients. In these embodiments, the determination of the main food ingredient at block 308 may comprise selecting the food ingredient associated with the largest recipe quantity in the acquired recipe as the main food ingredient.

Returning back to FIG. 3, at block 310, it is determined whether an amount of overlap of the main food ingredient received in the receptacle 122 of the cooking apparatus 120 exceeds a predetermined threshold. More specifically, this determination may be performed by the processor 110 of the system 100. In some embodiments, the predetermined threshold may be associated with the main food ingredient determined at block 308.

In some embodiments, the method may further comprise receiving a user input indicating whether an amount of overlap of the main food ingredient received in the receptacle exceeds the predetermined threshold. In these embodiments, determining whether an amount of overlap of the main food ingredient exceeds the predetermined threshold at block 310 may be based on this received user input. For example, a user interface in the form of a touch screen may be provided at the cooking apparatus 120 at which a pop-up may be displayed with the text "Does the main food ingredient overlap in the food basket?" along with selectable options of "Yes" or "No". If the user selects "Yes", the processor 110 may be configured to determine that the amount of overlap of the main food ingredient exceeds the predetermined threshold. On the other hand if the user selects "No", the processor 110 may be configured to determine that the amount of overlap of the main food ingredient does not exceed the predetermined threshold. In this case, the predetermined threshold may correspond to a perception of the user in terms of an extent of overlapping of the main food ingredient in the receptacle ("food basket") of the cooking apparatus 120.

If it is determined at block 310 that the amount of overlap of the main food ingredient exceeds the predetermined threshold, the method may proceed to block 312 at which the scaled cooking time corresponding to the target serving size is determined based on the recipe scale factor determined at block 306 and the recipe cooking time in the recipe acquired at block 302. Conversely, although not illustrated in FIG. 3, in some embodiments if it is determined at block 310 that the amount of overlap of the main food ingredient received in the receptacle 122 does not exceed the predetermined threshold, the method may further comprise determining the recipe cooking time as the scaled cooking time.

Although not illustrated in FIG. 3, in some embodiments the method may further comprise determining whether the main food ingredient is potato. In this context, potato refers to food ingredients including regular potatoes, sweet potatoes, purple sweet potato, and cassava. This method step may be performed between block 308 at which the main food ingredient is determined and block 310 at which it is determined whether an amount of overlap of the main food ingredient received in the receptacle 122 exceeds the predetermined threshold. Moreover, this method step may be performed by the processor 110 of the system 100. Typical examples of main food ingredients include: chicken drumstick, chicken wing, beef, pork steak, potato, sweet potato, fish fillet, muffins, and cake. The processor 110 may be configured to determine that the main food ingredient is potato if the main food ingredient is (regular) potato, sweet potato, or yam.

In these embodiments, if it is determined that the main food ingredient is potato, at block 312 the determination of the scaled cooking time may comprise: acquiring a quantity of the potato received in the receptacle 122 of the cooking apparatus 120, obtaining a scaling value by multiplying the quantity of the potato received in the receptacle 122 of the cooking apparatus 120 by a predetermined ingredient scale factor, and determining whether the target serving size acquired at block 304 is larger or smaller than the recipe serving size of the recipe acquired at block 302. If it is determined that the target serving size is larger than the recipe serving size, the scaled cooking time is determined as a sum of the recipe cooking time and the scaling value. Conversely, if it is determined that the target serving size is smaller than the recipe serving size, the scaled cooking time is determined as a difference between the recipe cooking time and the scaling value. Accordingly, the determination of the scaled cooking time in the case that the main food ingredient is potato can be represented by the equation below:

$$\text{scaled cooking time} = \text{recipe cooking time} \pm \text{scaling value} \quad (2)$$

As mentioned above, the scaling value may be obtained by multiplying the quantity of the potato received in the receptacle 122 (weight in gram) by a predetermined ingredient scale factor. In some embodiments, the predetermined ingredient scale factor may be 0.0170314. The predetermined ingredient scale factor value of 0.0170314 is obtained based on practical in-house experimental testing which takes into account of an amount of food, cooking temperature, sizes of potatoes, etc. Nevertheless, it will be understood that other predetermined ingredient scale factors can be used. Taking the value of 0.0170314, the scaling value may be obtained using the equation below:

$$\text{scaling value} = 0.0170314 \times \text{an amount of potato received in the receptacle} \quad (3)$$

Furthermore, in these embodiments, by combining equation (2) and equation (3), we can obtain equation (4) outlined below:

$$\text{scaled cooking time} = \text{recipe cooking time} \pm 0.0170314 \times \text{an amount of potato} \quad (4)$$

If it is determined that the main food ingredient is not potato, at block 312 the determination of the scaled cooking time may comprise obtaining a (different) scaling value by multiplying the recipe cooking time by an exponential of the recipe scale factor. Accordingly, in some embodiments the determination of the scaled cooking time in the case that the main food ingredient is not potato can be represented by the equation below:

$$\text{scaled cooking time} = \text{recipe cooking time} \times \text{recipe scale factor}^k \quad (5)$$

The exponent k in this scenario has a predetermined value. In some embodiments, the exponent may be ⅓. Therefore, in these embodiments, the determination of the scaled cooking time can be represented by the equation below:

$$\text{scaled cooking time} = \text{recipe cooking time} \times \text{recipe scale factor}^{1/3} \quad (6)$$

As mentioned above, in some embodiments the recipe acquired at block 302 may further comprise information associated with a recipe quantity of each of the one or more food ingredients. In these embodiments, the method may further comprise determining a scaled quantity for each of the one or more food ingredients in the acquired recipe based on the recipe scale factor determined at block 306.

The determination of a scaled quantity for each of the one or more food ingredients in the acquired recipe based on the recipe scale factor may comprise performing the following steps for each of the one or more food ingredients: determining a preliminary scaled quantity by multiplying the respective recipe quantity by the determined recipe scale factor, determining whether the recipe quantity is expressed in one of: a weight value, a non-weight value, or a unit of measurement value, and determining a resulting scaled quantity for the respective food ingredient based on whether the respective recipe quantity is expressed in one of: a weight value, a non-weight value, or a unit of measurement value.

If the recipe quantity is expressed in a weight value, the resulting scaled quantity may be determined such that it has the same value as the preliminary scaled quantity. If the recipe quantity is expressed in a non-weight value, the resulting scaled quantity may be determined by rounding up the preliminary scaled quantity to the nearest integer, where a minimum value of the resulting scaled quantity is 1. If the recipe quantity is expressed in a unit of measurement value, the resulting scaled quantity may be determined by rounding off the preliminary scaled quantity to the nearest quarter unit of measurement.

As an example, the recipe acquired at block 302 may call for the following quantities of food ingredients: "2 eggs", "1 clove of garlic", "1 cup of water", "6 pieces of pork steak", "0.5 teaspoon of pepper", "1 tablespoon of mustard", and "500 g of mushrooms". Moreover, in this example the determined recipe scale factor is 0.5 (e.g. with recipe serving size of "4 people" and target serving size of "2 people"). In this case, the processor 110 is configured to determine that the quantities "2 eggs", "1 clove of garlic", and "6 pieces of pork steak" are expressed in non-weight values, that the quantities "1 cup of water", "0.5 teaspoon of pepper", and "1 tablespoon of mustard" are expressed in unit of measurement values, and that the quantity "500 g of mushrooms" is expressed in a weight value. Based on this as well as the determined recipe scale factor of 0.5, the respectively resulting scaled quantities of the food ingredients would be "1 egg", "1 clove of garlic", "0.5 cup of water", "3 pieces of pork steak", "0.25 teaspoon of pepper", "0.5 tablespoon of mustard", and "250 g of mushrooms".

In some embodiments, the determination of the resulting scaled quantities of each of the one or more food ingredients may be further based on at least one of: a capacity of the receptacle 122 of the cooking apparatus 120 and an ingredient threshold value for the respective food ingredient. To illustrate this, the respective maximum capacities of a number of different exemplary models of air fryers are provided in the table below:

TABLE 1

The capacity of the receptacle, maximum capacity of the receptacle for potato, and the maximum capacity for other food ingredients for respective exemplary air fryer models

| Air fryer model | Maximum capacity of receptacle (L) | Maximum capacity for potato (kg) | Maximum capacity for other food ingredients (kg) |
| --- | --- | --- | --- |
| Large-sized model | 6.715 | 1.4 | 2.2 |
| Medium-sized model | 5.392 | 1.2 | 1.8 |
| Small-sized model | 4.266 | 0.8 | 1.4 |

As shown in the table above, for the each of the different exemplary models of air fryers, a maximum capacity of the receptacle, a maximum capacity for potato, and a maximum capacity for other food ingredients (i.e. non-potato food ingredients) are provided. The maximum capacity for potato and the maximum capacity for other food ingredients can both be regarded as ingredient threshold values. Taking the example of the medium-sized model air fryer, the maximum capacity for potato is 1.2 kg, and the maximum capacity for other food ingredients is 1.8 kg. In this case, determination of the resulting scaled quantities of each of the one or more food ingredients may be further based on these values. In more detail, a resulting scaled quantity for potato for a recipe may be compared against the maximum capacity for potato of the air fryer model.

For example, if a preliminary scaled quantity for potato (which is calculated by multiplying the respective recipe quantity by the determined recipe scale factor) is more than 1.2 kg when using the medium-sized model air fryer, the resulting scaled quantity for potato for this recipe may be determined as 1.2 kg instead of the preliminary scaled quantity of potato (or a rounded-up/rounded-off value of the preliminary scaled quantity of potato). Similarly, if a preliminary scaled quantity for another food ingredient (which is also calculated by multiplying the respective recipe quantity by the determined recipe scale factor) is more than 1.8 kg when using the medium-sized model air fryer, the resulting scaled quantity for the food ingredient may be determined as 1.8 kg instead of the preliminary scaled quantity (or a rounded-up/rounded-off value of the preliminary scaled quantity).

Additionally or alternatively, determination of the resulting scaled quantities of each of the one or more food ingredients may be further based on the maximum capacity of the receptacle of the cooking apparatus. Again, taking the example of the medium-sized model air fryer, the maximum capacity of the receptacle of the air fryer is 5.392 L. In this case, determination of the resulting scaled quantities of each of the one or more food ingredients may be further based on this value. In more detail, the sum the preliminary scaled quantities (or their rounded-up/rounded-off values) of the plurality of food ingredients in the recipe may be calculated and subsequently the sum is compared against the maximum capacity of the receptacle of the air fryer model. If the sum of the preliminary scaled quantities is larger than the maximum capacity of the receptacle, the resulting scaled quantity of at least one of the food ingredients may be reduced such that the sum of the resulting scaled quantities of the food ingredients is not larger than the maximum capacity of the receptacle.

To further illustrate the maximum capacity for other food ingredients, the respective maximum capacities for other food ingredient (e.g. chicken drumstick) for the different exemplary models of air fryers are provided in the table below:

TABLE 2

The ingredient threshold values of a number of food ingredients for respective exemplary air fryer models.

| Food ingredient | Large-sized model (g) | Medium-sized model (g) | Small-sized model (g) |
| --- | --- | --- | --- |
| Drumstick | 941 | 808 | 546 |
| Whole chicken wing | 683 | 525 | 335 |
| Chicken wing flats | 571 | 503 | 316 |
| Chicken wing drums | 736 | 623 | 514 |
| Medium sized potato (whole) | 1347 | 1183 | 827 |
| Baby potato (whole) | 901 | 774 | 564 |

There is thus provided a method for determining a scaled cooking time for operating a cooking apparatus and a system for determining a scaled cooking time for operating a cooking apparatus, which overcome the existing problems.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method at a control unit for determining a scaled cooking time for operating a cooking apparatus, wherein the cooking apparatus comprises a receptacle configured to receive one or more food ingredients, the computer-implemented method comprising:
    acquiring, from a local file in a memory of a system, a recipe comprising information associated with: the one or more food ingredients, a recipe serving size, and a recipe cooking time;
    acquiring, via a user interface of the system, a target serving size, wherein the target serving size is different from the recipe serving size;
    determining, by a processor of the system, a recipe scale factor based on the target serving size and the recipe serving size;
    selecting, by the processor, a food ingredient associated with the largest recipe quantity in the acquired recipe as a main food ingredient;
    determining, by a sensor unit of the system, whether an amount of overlap of the main food ingredient in the receptacle of the cooking apparatus exceeds a predetermined threshold;
    determining, by the processor, the scaled cooking time corresponding to the target serving size based on the determined recipe scale factor and the recipe cooking time when the amount of overlap of the main food ingredient in the receptacle exceeds the predetermined threshold; and
    operating, by the processor, the cooking apparatus based on the determined scaled cooking time.

2. The computer-implemented method according to claim 1, further comprising:
    determining, by the processor, whether the main food ingredient is a first food ingredient, wherein if it is determined that the main food ingredient is the first food ingredient, determining, by the processor, the scaled cooking time comprises:
        acquiring a quantity of the first food ingredient received in the receptacle of the cooking apparatus;
        obtaining a scaling value by multiplying the quantity of the first food ingredient received in the receptacle by a predetermined ingredient scale factor; and
        determining whether the target serving size is larger or smaller than the recipe serving size,
            wherein if it is determined that the target serving size is larger than the recipe serving size, the scaled cooking time is a sum of the recipe cooking time and the scaling value, and if it is determined that the target serving size is smaller than the recipe serving size, the scaled cooking time is a difference between the recipe cooking time and the scaling value.

3. The computer-implemented method according to claim 1, wherein if it is determined that the main food ingredient is not the first food ingredient, determining, by the processor, the scaled cooking time comprises obtaining a different scaling value by multiplying the recipe cooking time by an exponential of the recipe scale factor, and wherein the exponent has a predetermined value.

4. The computer-implemented method according to claim 1, wherein the acquired recipe further comprises information associated with a recipe quantity of each of the one or more food ingredients, and wherein the computer-implemented method further comprises determining, by the processor, a scaled quantity for each of the one or more food ingredients in the acquired recipe based on the determined recipe scale factor.

5. The computer-implemented method according to claim 4, wherein determining the scaled quantity for each of the one or more food ingredients in the acquired recipe comprises performing, by the processor, the following steps for each of the one or more food ingredients:
    determining a preliminary scaled quantity by multiplying the respective recipe quantity by the determined recipe scale factor;
    determining whether the recipe quantity is expressed in one of: a weight value, a non-weight value, or a unit of measurement value; and
    determining a resulting scaled quantity for the respective food ingredient based on whether the respective recipe quantity is expressed in one of: a weight value, a non-weight value, or a unit of measurement value.

6. The computer-implemented method according to claim 5, wherein:
    if the recipe quantity is expressed in a weight value, the resulting scaled quantity has the same value as the preliminary scaled quantity,
    if the recipe quantity is expressed in a non-weight value, the resulting scaled quantity is determined by rounding up the preliminary scaled quantity to a nearest integer, wherein a minimum value of the resulting scaled quantity is 1, and
    if the recipe quantity is expressed in a unit of measurement value, the resulting scaled quantity is determined by rounding off the preliminary scaled quantity to a nearest quarter unit of measurement.

7. The computer-implemented method according to claim 1, wherein if it is determined that the amount of overlap of the main food ingredient in the receptacle does not exceed the predetermined threshold, the computer-implemented method further comprises determining, by the processor, the recipe cooking time as the scaled cooking time.

8. The computer-implemented method according to claim 1, wherein acquiring the recipe comprises receiving, by the processor and via the user interface, a user selection of the recipe from a plurality of recipes associated with the cooking apparatus.

9. The computer-implemented method according to claim 1, further comprising receiving, by the processor via the user interface, a user input indicating whether the amount of overlap of the main food ingredient in the receptacle exceeds the predetermined threshold, wherein determining whether the amount of overlap of the main food ingredient exceeds the predetermined threshold is based on the received user input.

10. The computer-implemented method according to claim 1, wherein acquiring, by the processor, the target serving size comprises receiving a user input, via the user interface, indicating the target serving size.

11. The computer-implemented method according to claim 1, wherein the predetermined threshold is associated with the determined main food ingredient.

12. A system for determining a scaled cooking time for operating a cooking apparatus, wherein the cooking apparatus comprises a receptacle configured to receive one or more food ingredients, the system comprising a processor configured to:
   acquire, from a local file in a memory, a recipe comprising information associated with:
   the one or more food ingredients, a recipe serving size, and a recipe cooking time;
   acquire, via a user interface, a target serving size, wherein the target serving size is different from the recipe serving size;
   determine a recipe scale factor based on the target serving size and the recipe serving size;
   select a food ingredient associated with the largest recipe quantity in the acquired recipe as a main food ingredient;
   determine, via a sensor unit, whether an amount of overlap of the main food ingredient in the receptacle of the cooking apparatus exceeds a predetermined threshold,
   determine the scaled cooking time corresponding to the target serving size based on the determined recipe scale factor and the recipe cooking time when the amount of overlap of the main food ingredient in the receptacle exceeds the predetermined threshold; and
   operate the cooking apparatus based on the determined scaled cooking time.

13. The system according to claim 12, further comprising the cooking apparatus, and wherein the processor is connectable to the cooking apparatus wirelessly.

14. The system according to claim 12, wherein the cooking apparatus comprises:
   the receptacle configured to receive the one or more food ingredients; and
   a sensor unit arranged adjacent to the receptacle, wherein the sensor unit is configured to detect a status of the one or more food ingredients in the receptacle,
      wherein the processor is further configured to determine whether the amount of overlap of the main food ingredient in the receptacle exceeds the predetermined threshold based on the detected status of the one or more food ingredients in the receptacle.

15. A non-transitory computer-readable storage medium comprising computer program for determining a scaled cooking time for operating a cooking apparatus, the cooking apparatus comprising a receptacle configured to receive one or more food ingredients, wherein the computer program, upon execution by a processor, causes the processor to:
   acquire, from a local file in a memory of a system, a recipe comprising information associated with: the one or more food ingredients, a recipe serving size, and a recipe cooking time;
   acquire, via a user interface of the system, a target serving size, wherein the target serving size is different from the recipe serving size;
   determine a recipe scale factor based on the target serving size and the recipe serving size;
   select a food ingredient associated with the largest recipe quantity in the acquired recipe as a main food ingredient;
   determine, via a sensor unit of the system, whether an amount of overlap of the main food ingredient in the receptacle of the cooking apparatus exceeds a predetermined threshold;
   determine the scaled cooking time corresponding to the target serving size based on the determined recipe scale factor and the recipe cooking time when the amount of overlap of the main food ingredient in the receptacle exceeds the predetermined threshold; and
   operate the cooking apparatus based on the determined scaled cooking time.

16. The non-transitory computer-readable storage medium according to claim 15, wherein the acquired recipe further comprises information associated with a recipe quantity of each of the one or more food ingredients, and wherein the computer program further causes the processor to determine a scaled quantity for each of the one or more food ingredients in the acquired recipe based on the determined recipe scale factor.

17. The computer-implemented method according to claim 5, wherein determining the resulting scaled quantity for each of the one or more food ingredients in the acquired recipe is further based on a capacity of the receptacle of the cooking apparatus and an ingredient threshold value for the respective food ingredient.

18. The computer-implemented method according to claim 17, wherein the ingredient threshold value for the respective food ingredient is the maximum capacity for the respective food ingredient in the receptacle.

19. The computer-implemented method according to claim 1, wherein determining the recipe scale factor comprises determining a ratio of the target serving size and the recipe serving size.

* * * * *